United States Patent
Karamavruc et al.

(10) Patent No.: US 8,162,599 B2
(45) Date of Patent: Apr. 24, 2012

(54) STEPPED STATOR BLADE

(75) Inventors: Aliihsan Karamavruc, Wooster, OH (US); William Brees, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1024 days.

(21) Appl. No.: 12/151,260

(22) Filed: May 5, 2008

(65) Prior Publication Data

US 2008/0279692 A1  Nov. 13, 2008

Related U.S. Application Data

(60) Provisional application No. 60/966,323, filed on Aug. 27, 2007, provisional application No. 60/928,437, filed on May 9, 2007.

(51) Int. Cl.
*F01D 9/02* (2006.01)
(52) U.S. Cl. .................... 415/191; 415/208.2
(58) Field of Classification Search ........... 415/191, 415/192, 208.1, 208.2, 209.1; 60/361, 362
See application file for complete search history.

(56) References Cited

U.S. PATENT DOCUMENTS

| | | | | | |
|---|---|---|---|---|---|
| 5,836,157 | A | * | 11/1998 | Kosuge | 60/362 |
| 6,065,287 | A | * | 5/2000 | Yamamoto | 60/361 |
| 7,850,420 | B2 | * | 12/2010 | Brees et al. | 415/146 |
| 2004/0237516 | A1 | | 12/2004 | Shin | |
| 2007/0045076 | A1 | | 3/2007 | Brees et al. | |
| 2007/0137977 | A1 | | 6/2007 | Peri et al. | |
| 2007/0140841 | A1 | | 6/2007 | George et al. | |
| 2007/0224042 | A1 | | 9/2007 | Brees et al. | |

* cited by examiner

*Primary Examiner* — Edward Look
*Assistant Examiner* — Liam McDowell
(74) *Attorney, Agent, or Firm* — Simpson & Simpson, PLLC

(57) ABSTRACT

A blade for a stator in a torque converter including a first face, which includes a first step, and a second face located substantially circumferentially opposite the first face. In one embodiment, the first face includes first and second disjointed or misaligned segments, and the first step connects the first and second segments. In another embodiment, the second face includes a second step. In yet another embodiment, the second face includes third and fourth disjointed or misaligned segments, and the second step connects the first and second segments.

13 Claims, 5 Drawing Sheets

STEPPED STATOR BLADE

CROSS-REFERENCE TO RELATED APPLICATIONS

This application claims the benefit under 35 U.S.C. §119 (e) of U.S. Provisional Application No. 60/966,323 filed Aug. 27, 2007 and U.S. Provisional Application No. 60/928,437 filed May 9, 2007.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to new stator blade cross-sectional profiles.

BACKGROUND OF THE INVENTION

Torque converters including stators with blades are known in the art. Conventional stator blades typically have profiles substantially similar to an airfoil. It would be desirable to create a stator blade which increases the mass flow rate through the stator at both high and low speed ratios. An improved mass flow is known to lower the k-factor, and therefore increase the torque capacity of the torque converter.

It should be appreciated that one could increase the mass flow rate by spacing adjacent stator blades farther apart. However, spacing the blades farther apart would also have the undesirable consequence of reducing channeling. Reduced channeling is known in the art to reduce efficiency of a torque converter. Thus, unfortunately, modifying a stator or stator blades to improve one torque converter parameter, such as torque capacity, typically results in an undesirable reduction in other parameters, such as torque ratio or efficiency.

Thus, there is a long-felt need for a stator blade that enables an increase in torque capacity while maintaining previous values for other parameters such as torque ratio and efficiency.

BRIEF SUMMARY OF THE INVENTION

The present invention broadly comprises a blade for a stator in a torque converter including a first face, which includes a first step, and a second face located substantially circumferentially opposite the first face. In one embodiment, the first face includes first and second disjointed or misaligned segments and the first step connects the first and second segments. In another embodiment, the second face includes a second step. In another embodiment, the second face includes third and fourth disjointed or misaligned segments, and the second step connects the first and second segments. In yet another embodiment, the blade includes a first body portion and a second body portion offset with respect to the first body portion, and a step body portion connects the first second body portions.

The present invention also broadly comprises a blade assembly for a stator in a torque converter including a first blade with a first face including first and second disjointed segments connected by a first step and a second blade with a second face including third and fourth disjointed segments connected by a second step. During operation of the stator, respective fluid pressures on the first and second step surfaces are less than fluid pressures on the first or second and third or fourth disjointed segments, respectively. During operation of the stator, the first step surface enables an increase in fluid flow between the first and second blades. The increase in fluid flow decreases a k-factor for the torque converter.

The present invention further broadly comprises a blade for a stator in a torque converter including a first face including first and second disjointed segments connected by a step and a second face located substantially circumferentially opposite the first face.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed embodiments.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
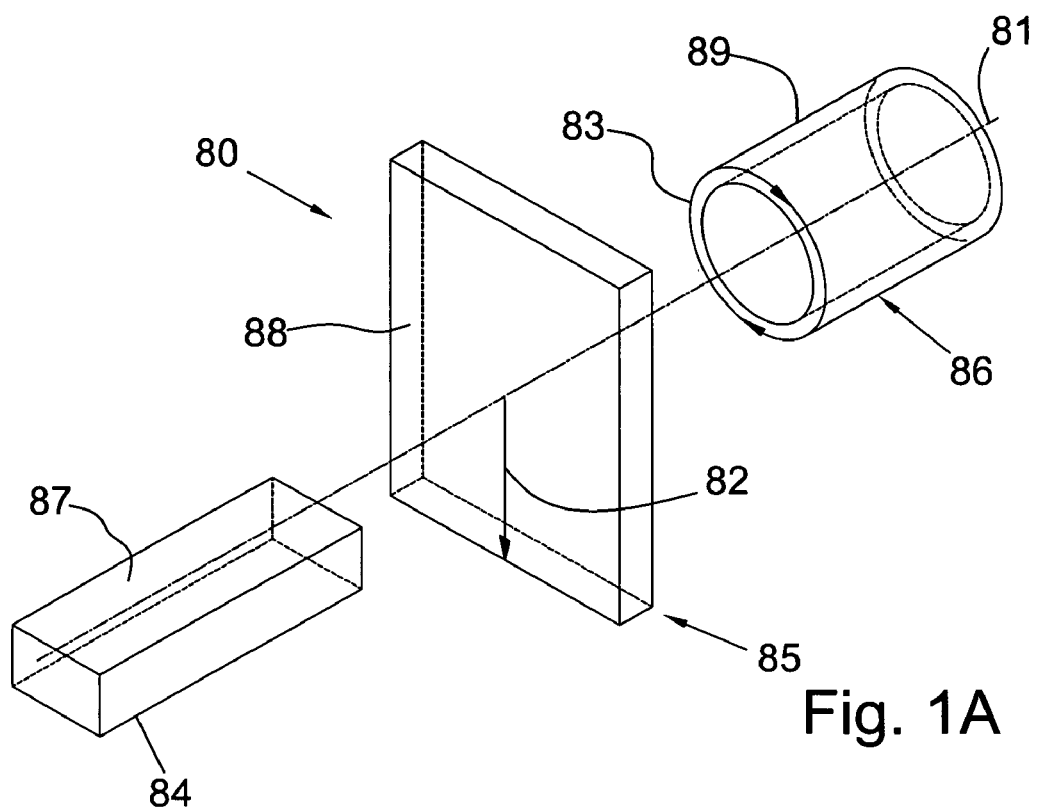
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
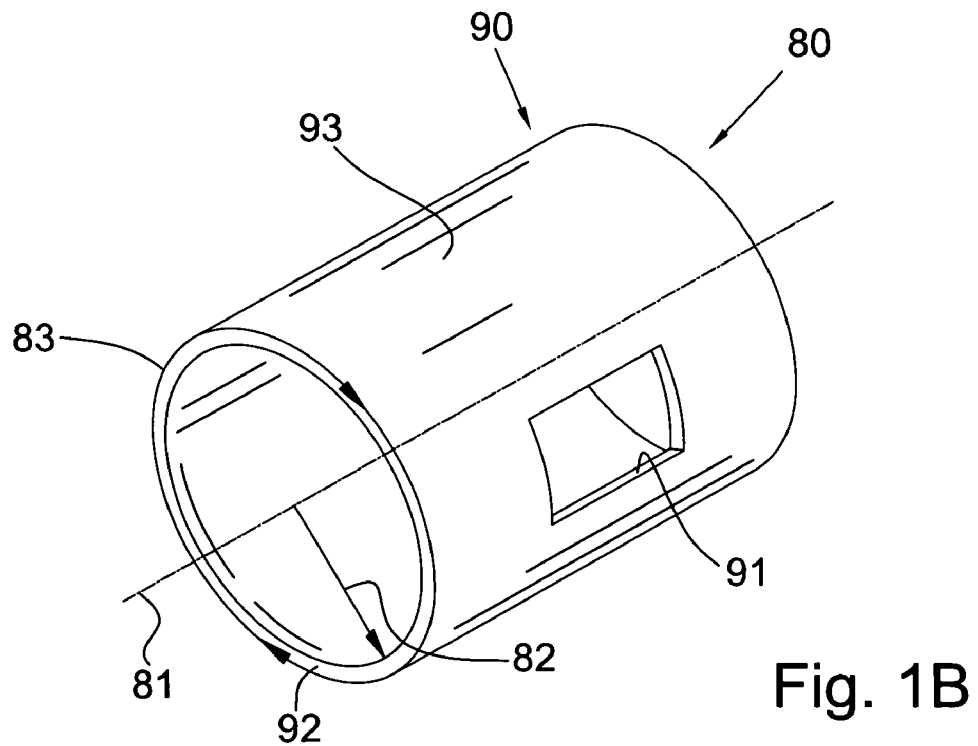
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
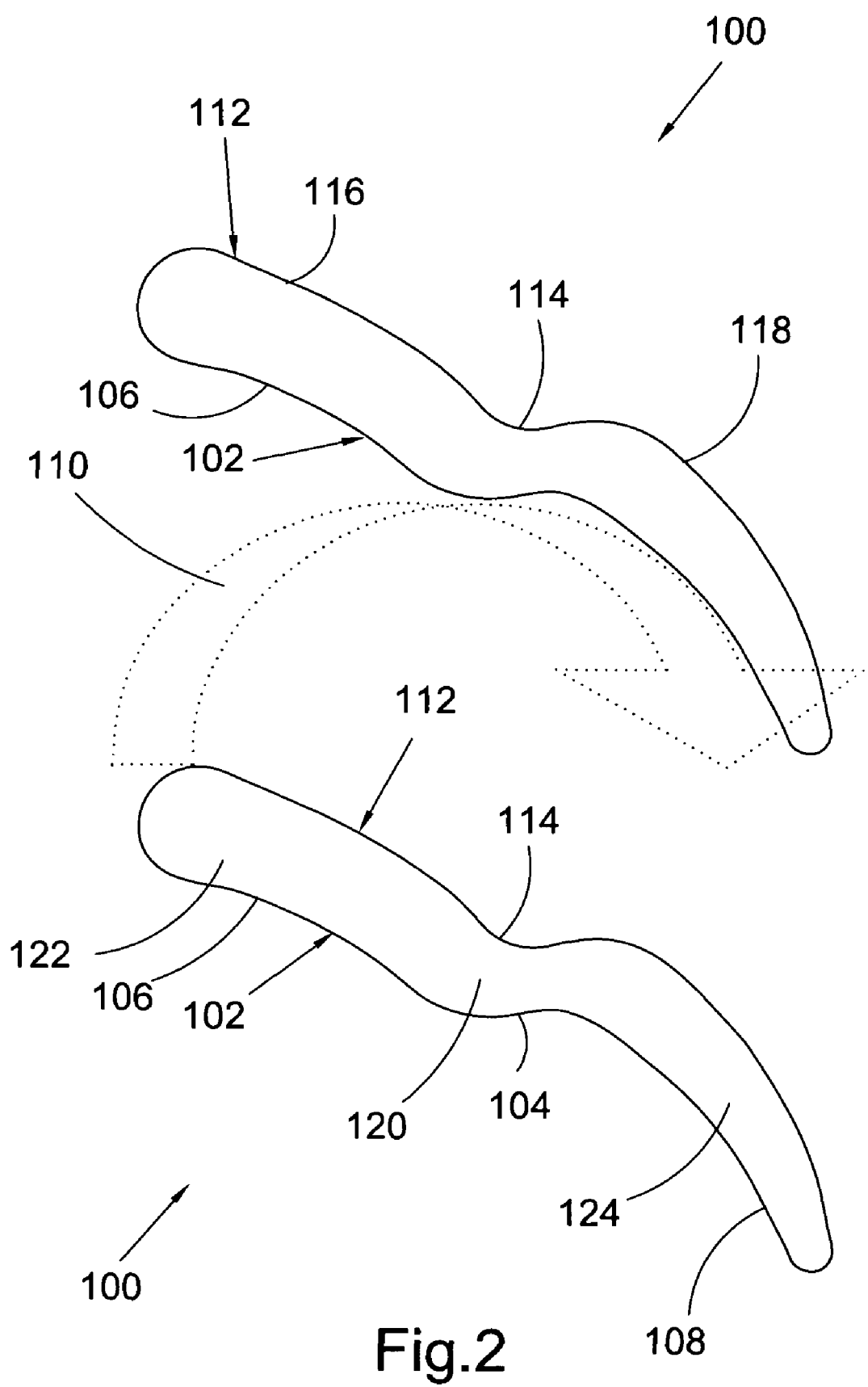
FIG. 2 is a profile of present invention stepped stator blades demonstrating fluid flow through a stator of a torque converter at a low speed ratio.

FIG. 2 is a profile of present invention stepped stator blades 100 demonstrating fluid flow through a stator (not shown) of a torque converter (not shown) at a low speed ratio. Stator blade 100 has face, or surface, 102 and face, or surface, 112, with the faces located substantially circumferentially opposite each other. Face 102 includes surface segments 106 and 108, and step, or step surface, 104. In a preferred embodiment, step 104 is located on face 102, as shown. Surface segments 106 and 108 are disjointed and are connected by step 104. By disjointed we mean that segments 106 and 108 do not form a surface with a smooth curvature, because of the presence of step 104. That is, face 102 does not have a smooth curvature, particularly at step 104. Alternately stated, segments 106 and 108 are misaligned.

Blade 100 includes body portion 122 and body portion 124 connected by step body portion 120. Portions 122 and 124 are misaligned, or disjoint, with respect to each other.

Arrow 110 represents the direction of the flow of fluid through the stator at low speed ratios of the torque converter, when blades 100 are installed in the stator. Two blades are shown in FIG. 2; however, it should be understood that a stator using blades 100 is not limited to a particular number of blades 100. The direction of the fluid changes as the fluid passes through the stator, specifically, between blades 100. The turning of the fluid occurs because the fluid contacts segment 106, the blade reacts to the force from the fluid, and the blade redirects the fluid down the stator blade towards segment 108. The fluid pressure at step 104 is substantially lower than fluid pressure at least one of segments 106 and 108. The step provides redirection for the fluid as the fluid travels to segment 108. The curvature of segment 108 continues directing the flow of fluid until the fluid exits out of the stator. The redirection of the fluid by step 104 enables the fluid to smoothly transition from segment 106 to segment 108, and therefore provide better turning of the fluid. For example, the angle at which the fluid turns in response to contacting segment 106 is advantageously reduced. As a result, the fluid slows down less as the fluid transitions from segment 106 to segment 108. The maintained speed of the fluid and the reduced turning angle of the fluid noted supra increase fluid flow rate past blades 100, increase the mass flow rate past blades 100, and increase the capacity of the torque converter.

Figure 3:
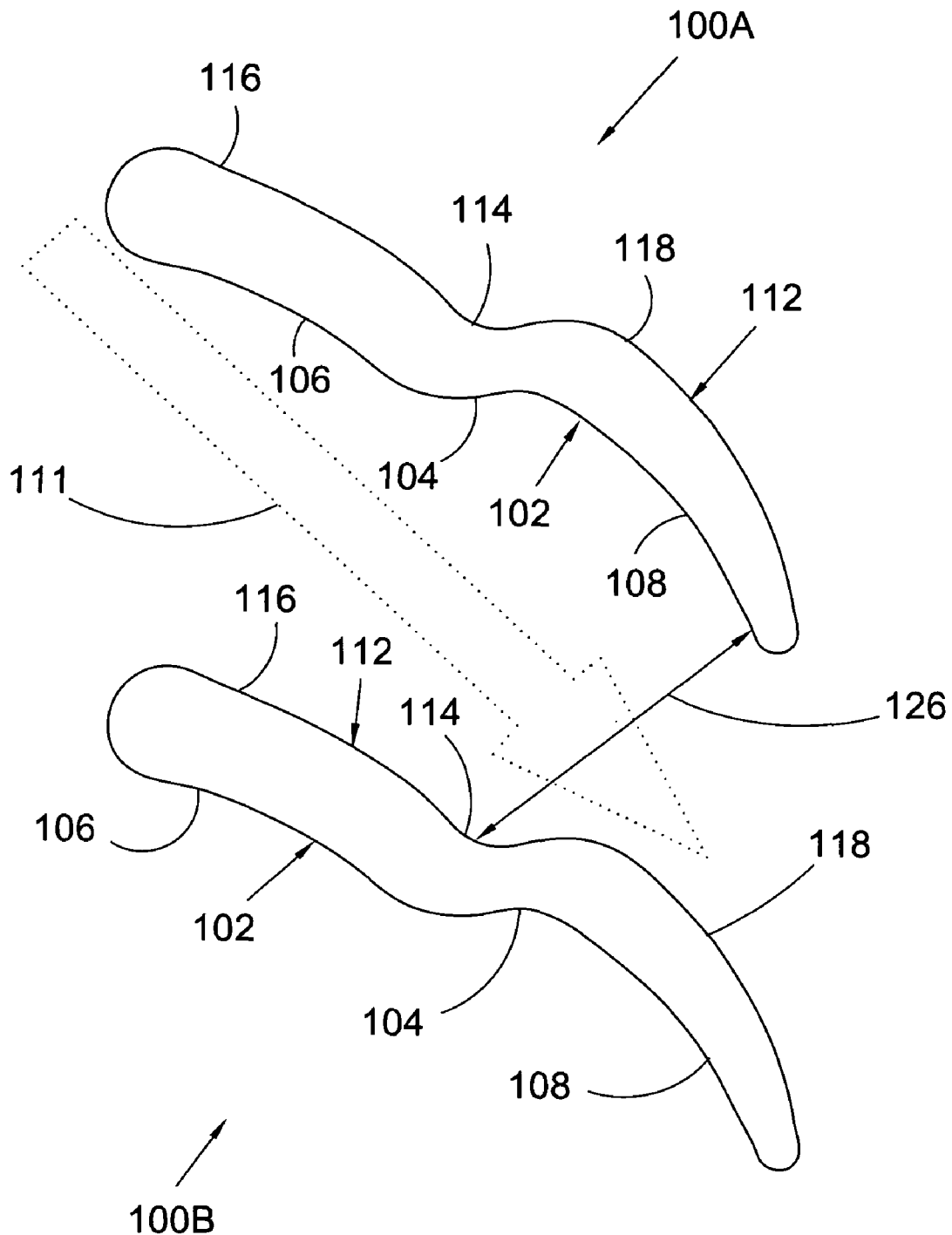
FIG. 3 is a profile of the stepped stator blades shown in FIG. 2 demonstrating fluid flow through the stator at a high speed ratio.

FIG. 3 is a profile of stepped stator blades 100 shown in FIG. 2 demonstrating fluid flow through the stator at a high speed ratio. The following should be viewed in light of FIGS. 2 and 3. Face 112 includes surface segments 116 and 118, and step 114. The discussion of FIG. 2 regarding face 102, segments 106 and 108 and step 104 is applicable to face 112, segments 116 and 118, and step 114.

Arrow 111 represents the general direction of the flow of fluid through the stator at high speed ratios of the torque converter, when blades 100 are installed in the stator. At high speed ratios the capacity of the torque converter is proportional to the mass flow of fluid through the stator. The mass flow is limited by a minimum flow area. The minimum flow area is represented in one dimension by distance 126 which is shown perpendicularly between the end of segment 108 on blade 100A and step 114 on blade 100B. Blades 100A and 100B are the same as blades 100, but are given identifying letters to differentiate them from each other in this particular figure. The second dimension which defines the minimum flow area is the width of the stator blade (not shown). The width of the stator blades is not germane to the invention, and any width known in the art for stator blades may work. However, the width is assumed to be consistent from blade to blade for comparison of the performances of differently profiled blades. Thus, due to the stepped configuration of blades 100, distance 126 and the minimum flow area, and consequently, the mass flow between blades 100A and 100B is increased. For example, the stepped configuration results in surface 108 of blade 100A being axially and circumferentially further from blade 100B and also results in step 114 of blade 100B being axially and circumferentially further from blade 100A.

Figure 4:
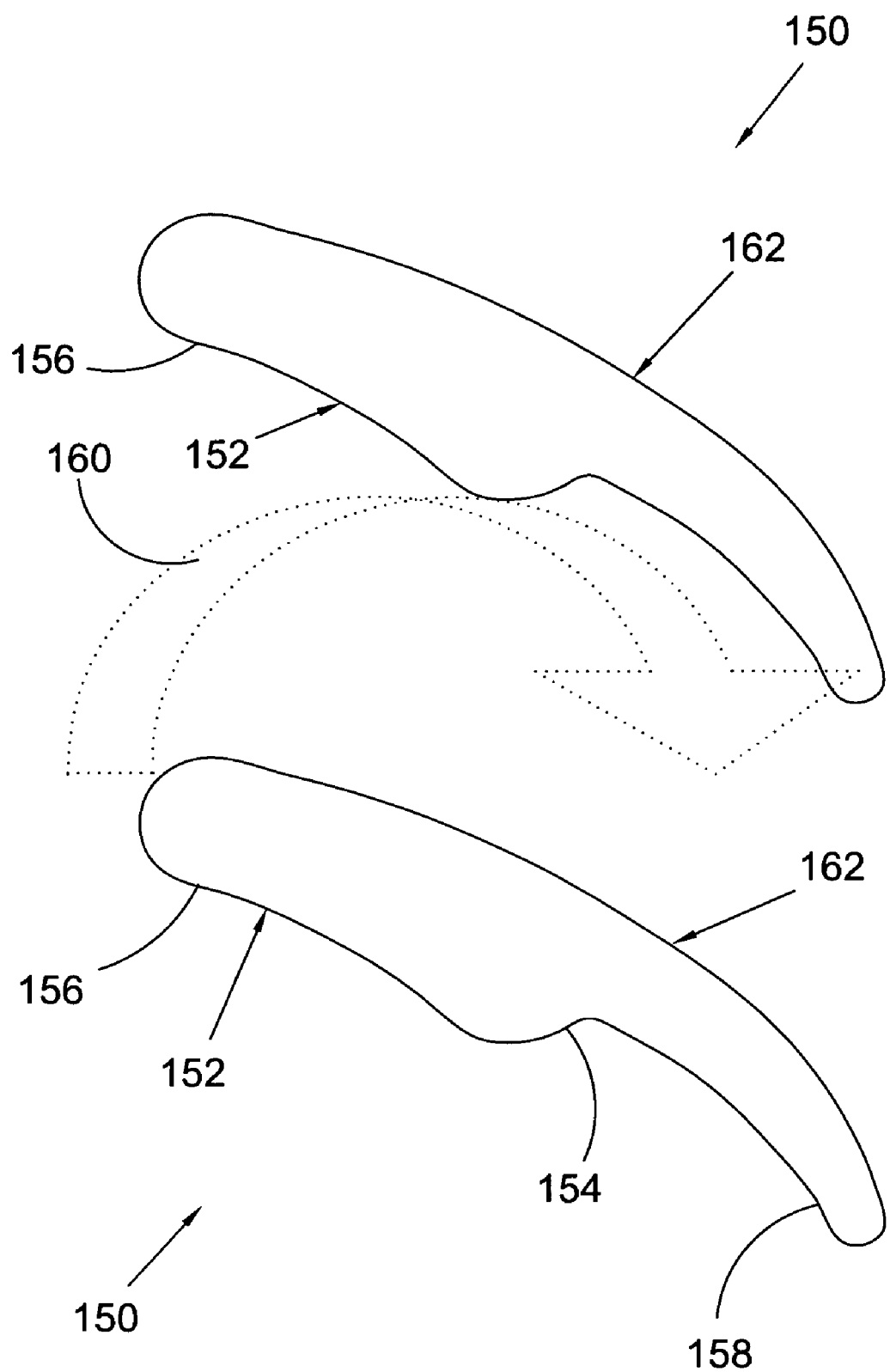
FIG. 4 is a profile of present invention stator blades having one stepped surface and one constant surface demonstrating fluid flow through the stator at a low speed ratio; and, FIG. 5 is a diagram comparing the performances of a present invention stepped stator blade and a constant surface blade.

FIG. 4 is a profile of present invention stator blades 150 having face, or surface, 152 and face, or surface, 162 demonstrating fluid flow through the stator at a low speed ratio. In this embodiment, face 152 is substantially similar to face 102 on stator blade 100. Face 152 includes segment 156 and segment 158 connected by step 154. Face 162 does not contain a step and is an example of a constant surface, airfoil shape, typical for conventional stator blades.

Arrow 160 represents the direction of fluid through the stator at low speed ratios of the torque converter, when blades 150 are installed in the stator. The discussion in the description of FIG. 2 regarding flow 110 is applicable to flow 160 in FIG. 4. That is, flows 110 and 160 behave in substantially the same way. Fluid contacts segment 156, the blade reacts to the force from the fluid, and the blade redirects the fluid down the blade towards segment 158. The fluid pressure at step 154 is substantially lower than the fluid pressure at least one of segments 156 and 158. The step provides redirection for the fluid as the fluid travels to segment 158. The redirection of the fluid by step 154 enables the fluid to smoothly transition from segment 156 to segment 158, and therefore provide better turning of the fluid. Despite the constant surface of second face 162, the flow of fluid remains substantially similar to the flow of fluid in the first embodiment, as illustrated in FIG. 2. Therefore, the absence of a second step on blade 150 does not significantly affect the turning properties of the fluid at high speed ratios.

Figure 5:
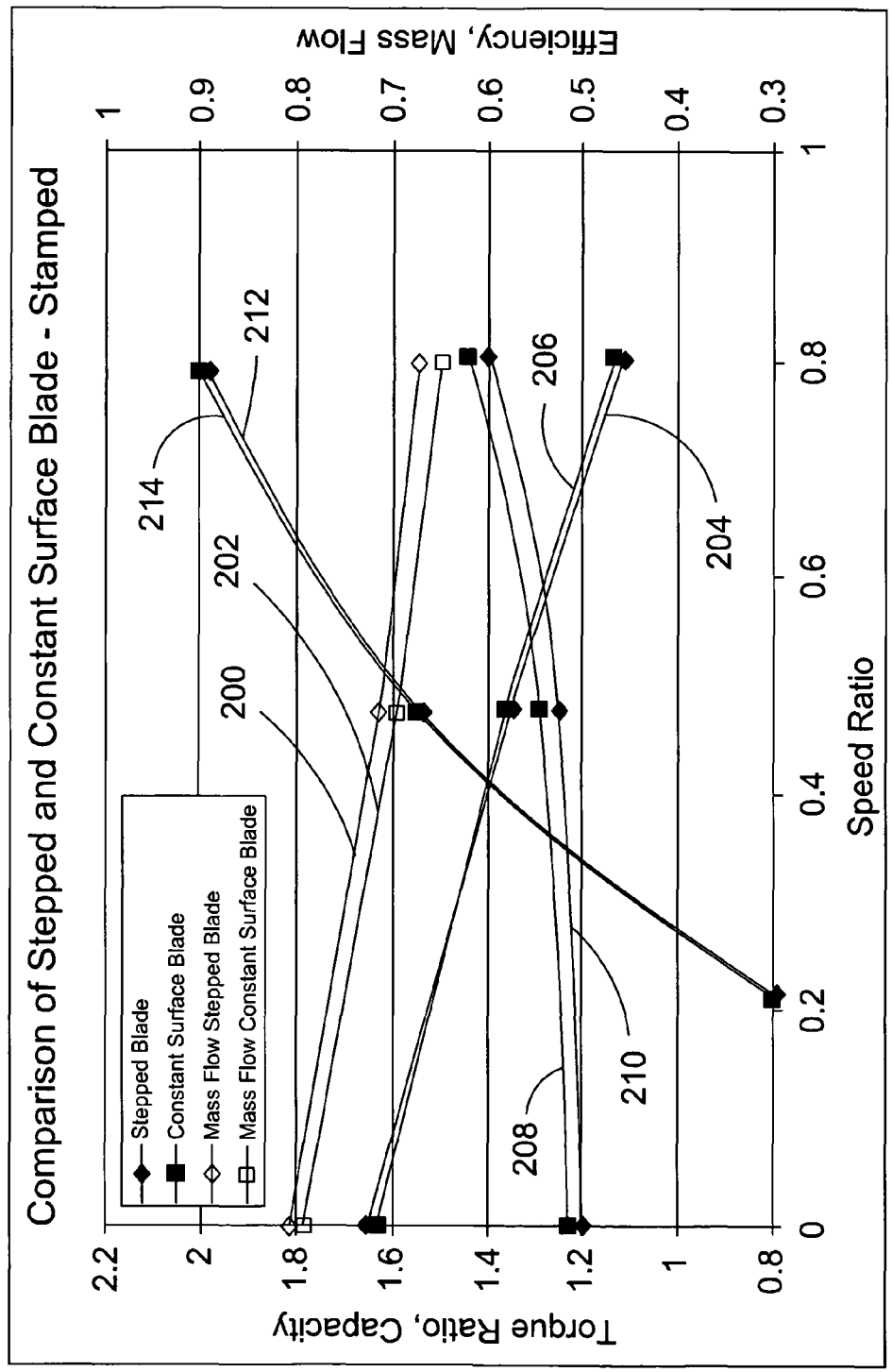

FIG. 5 is a diagram comparing the performances of present invention stepped stator blades and prior art constant surface blades in a stator (not shown) in a torque converter (not shown). It should be understood that the torque converter referenced in FIG. 5 can be any applicable torque converter known in the art. The following should be viewed in light of FIGS. 2-5. In FIG. 5, the present invention blades are blades 100, although it should be understood that in general, a present invention blade provides the benefits, with respect to a prior art blade, shown in FIG. 5 and described infra. Conventional, constant surface blades do not contain steps, for example, step 104 in FIG. 2. That is, a conventional blade has a profile that closely resembles the shape of an airfoil. As discussed supra, present invention stepped blades, for example, blade 100 in FIGS. 2 and 3, provide improved fluid turning for low speed ratios and increased minimum fluid flow area for high speed ratios. Some beneficial results of the fluid turning and increased mass flow are shown in FIG. 5.

Curves 208 and 210 illustrate the relationship between the speed ratio and the k-factor, or torque capacity, for a torque converter using the stepped stator blade and the torque converter using a prior art constant surface stator blade, respectively. As is known in the art, lowering the k-factor results in an increase in torque capacity. At a zero speed ratio, curve 210 is lower than curve 208. As the speed ratio increases to 0.8, the difference between the respective curves (k-factors) increases. The lower k-factor for curve 208 indicates a substantial improvement in torque capacity for a torque converter using a present invention blade.

Curve 200 represents the relationship between the speed ratio and mass flow for the torque converter using the present invention stepped blade noted supra. Curve 202 represents the speed ratio and mass flow for the torque converter using the constant surface blade noted supra. The mass flow is advantageously higher for the stepped blade. As previously described, the stepped blade results in the increased mass flow by providing improved fluid turning at low speed ratios and a larger minimum flow area at higher speed ratios. Increasing the mass flow results in an improvement in k-factor and therefore torque capacity, as shown in curves 208 and 210.

The relationship between the speed ratio and torque ratio for the torque converter using the stepped blades and the constant surface blades are illustrated as curves 204 and 206, respectively. Curves 212 and 214 represent the relationship between the speed ratio and efficiency for the torque converter using the stepped stator blades and constant stator blades, respectively. As noted supra, using prior art blades, an increase in one of the k-factor, torque ratio, or efficiency, is only possible by decreasing one or both of the remaining parameters. However, the torque ratio and the efficiency associated with blades 100 and the prior art blades are nearly identical. Therefore, the stepped stator blade advantageously enables a significant improvement in k-factor, which represents a significant and desirable gain in torque capacity, while maintaining virtually the same efficiency and torque ratio.

It should be appreciated that the present invention stepped stator blade can be manufactured by casting, stamping, or any other blade manufacturing process known in the art.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A blade for a stator in a torque converter comprising:
    a first face including first and second surface segments axially connected by a first step; and,
    a second face including third and fourth surface segments axially connected by a second step, wherein:
        the blade is formed of a single piece of material;
        the first and second faces form first and second oppositely facing outer surfaces of the blade; and,
        the first and second faces fail to form respective single smooth curves.

2. The blade of claim 1 wherein the first and second surface segments are misaligned with respect to each other.

3. The blade of claim 1 wherein during operation of the stator, fluid pressure on the step is less than fluid pressure on at least one of the first or second disjointed segments.

4. The blade of claim 1 wherein during operation of the stator, the step enables an increase in fluid flow through the stator.

5. The blade of claim 4 wherein the increase in fluid flow through the stator decreases a k-factor for the torque converter.

6. The blade of claim 1 wherein the third and fourth segments are misaligned with respect to each other.

7. The blade of claim 1 including a first body portion and a second body portion offset with respect to the first body portion.

8. The blade of claim 7 further including a step body portion connecting the first body portion and the second body portion.

9. A blade assembly for a stator in a torque converter comprising:
    a first blade, formed of a first single piece of material, with a first face including first and second disjointed surface segments axially connected solely by a first step surface with a first curvature different from the respective curvatures of the first and second surface segments; and,
    a second blade, separate from the first blade and formed of a second single piece of material, with a second face, substantially facing the first face, including third and fourth disjointed surface segments axially connected solely by a second step surface with a second curvature different from the respective curvatures of the third and fourth surface segments.

10. The blade assembly of claim 9 wherein during operation of the stator, fluid pressure on the first step is less than fluid pressure on at least one of the first or second disjointed segments.

11. The blade assembly of claim 9 wherein during operation of the stator, fluid pressure on the second step is less than fluid pressure on at least one of the third or fourth disjointed segments.

12. The blade assembly of claim 9 wherein during operation of the stator, the first step enables an increase in fluid flow between the first and second blades.

13. The blade assembly of claim 12 wherein the increase in fluid flow decreases a k-factor for the torque converter.

* * * * *